United States Patent [19]
Vargas

[11] Patent Number: 5,628,170
[45] Date of Patent: May 13, 1997

[54] SUPPORT STAND FOR A CORE HARVESTER

[75] Inventor: Daniel R. Vargas, 9095 Cumberland Ave., Niles, Ill. 60714

[73] Assignee: Daniel R. Vargas, Des Plaines, Ill.

[21] Appl. No.: 546,987

[22] Filed: Oct. 23, 1995

[51] Int. Cl.$^6$ .............................. B65G 65/02; B62H 1/00
[52] U.S. Cl. ..................... 56/16.4 R; 56/228; 248/128; 248/146
[58] Field of Search ................................. 56/228, 16.4 R, 56/200; 248/127, 128, 146

[56] References Cited

U.S. PATENT DOCUMENTS

| | | |
|---|---|---|
| 4,770,577 | 9/1988 | Farris ................................ 56/228 X |
| 4,878,802 | 11/1989 | Hansen et al. . |
| 5,489,030 | 2/1996 | Kolbeck et al. ................. 248/127 X |

Primary Examiner—Terry Lee Melius
Assistant Examiner—Christopher J. Novosad
Attorney, Agent, or Firm—Hill, Steadman & Simpson

[57] ABSTRACT

The improved stand assembly of the present invention includes an upper end bracket for attachment to a core harvester apparatus proximate the elevated turf core discharge end thereof. At least one upper support arm for removable attachment to the upper end bracket when in a first or operative position is provided to support substantially the full weight of the turf core harvester apparatus when disposed into a second or inoperative position. At least one lower end support arm is further provided for removable engagement of the lower end of the core harvester apparatus when in the first or operative position and to support substantially the full weight of the lawn core harvester apparatus when disposed into the second or inoperative position. A frame is further provided to connect the upper support arm to the lower end support arm.

19 Claims, 2 Drawing Sheets

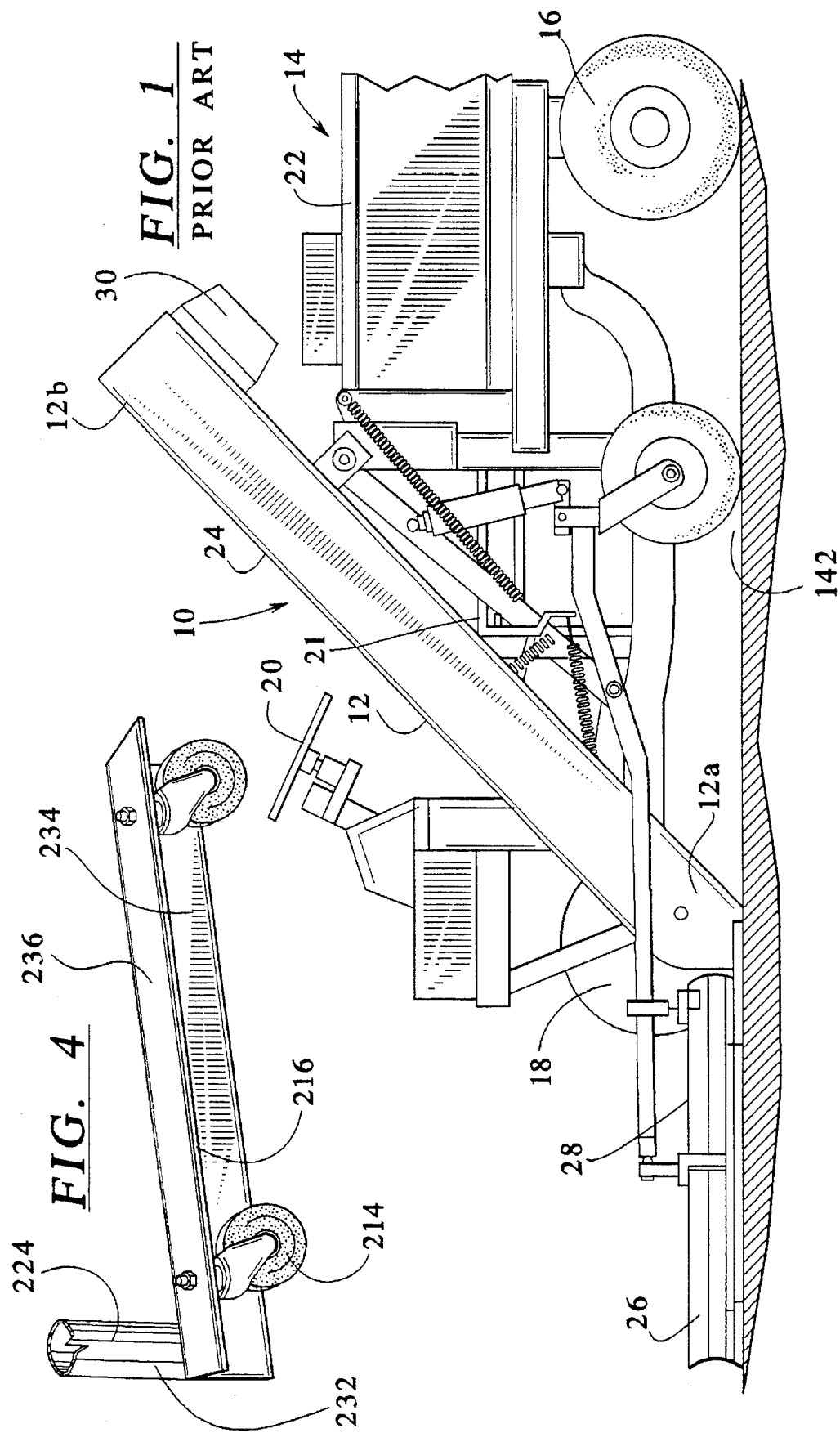

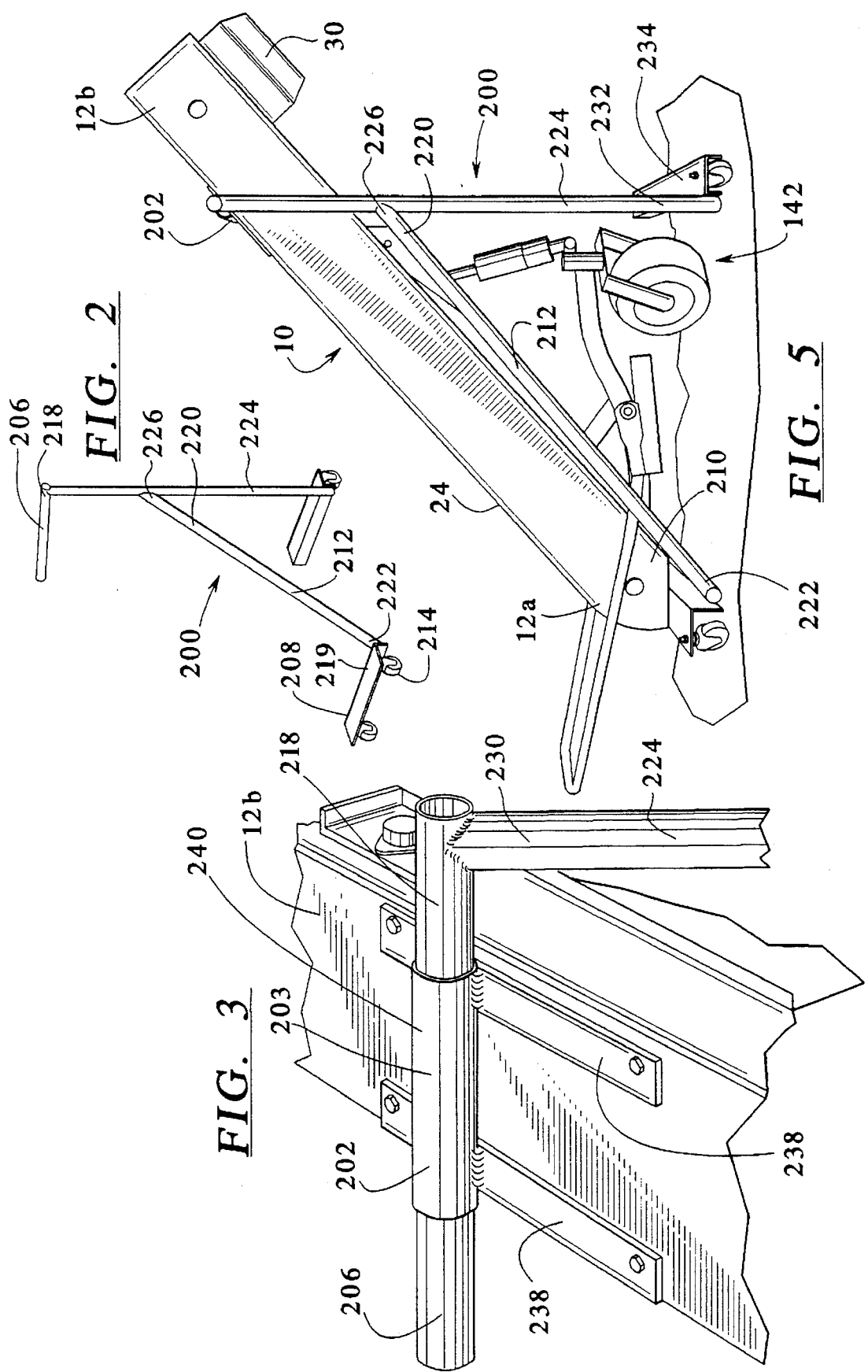

SUPPORT STAND FOR A CORE HARVESTER

BACKGROUND OF THE INVENTION

The present invention relates to maintenance apparatus in general, and more particularly to a support stand for a core harvester machine useful for, inter alia, providing aeration to turf, such as may be found on a golf course.

In the prior art, various machinery of a highly specialized kind has been developed for use in turf maintenance, such as ground aeration. One such widely used apparatus is that set forth in U.S. Pat. No. 4,878,802 entitled: "MACHINE FOR COLLECTING GROUND PARTICLES AND THE LIKE" to Hansen et al., and issued on Nov. 7, 1989.

These and other prior art machines have continued to provide a number of advantages in the care of turf surface, principally by means of gathering turf plugs and/or core particles resulting from the aeration of the turf surface, through the utilization of means operative to traverse the ground, and with associated means conveying such core particles or turf plugs upwardly, such as for example on a conveyor belt, and for dumping into an associated receptacle transported by a vehicle common to the core harvester machine and the collecting receptacle. Such conveyor means for these prior art core harvester machines is in preferred embodiments supported upon a truss frame arrangement in a generally parallelogrammic linkage arrangement which supports the conveyor means on ball joints for rotation substantially about its longitudinal axis. Such apparatus makes it possible to raise the lower receiving end of the conveyor vertically a greater distance at the upper end of the conveyor when the conveyor is raised to an inoperative position such as for transport. Such prior art core conveyor apparatus also preferably includes a shock absorbing support wheel which supports the conveyor and prevents side moments from acting upon the transport vehicle due to the side mounting of the conveyor.

Although these and other prior art core harvester machines have provided substantially improved functioning to assist in turf maintenance, and in particular have facilitated the aeration of such turf surfaces, maintenance operations on the core harvester machine, per se, have been of somewhat increased difficulty and in particular due to the desirable features of its side mounted and pivotable design have presented certain difficulties in a typical golf course maintenance shop and especially where only one person is available to mount, dismount and/or remount the core harvester machine into and from the operative position upon the transporting vehicle means for collecting turf plugs or other particles.

Accordingly, it is a material object of the improved support stand for a core harvester machine of the present invention to provide for improved and more efficient dismountability and transportation thereof, and for facilitating and ease of remounting the core harvester machine from an inoperative position back into the operative position upon conclusion of maintenance thereon.

These and other objects and advantages of the support stand for a core harvester machine of the present invention will become apparent to those of ordinary skill in the art upon review of the following summary of the invention, brief description of the drawing, detailed description of preferred embodiments, appended claims, and associated drawings.

SUMMARY OF THE INVENTION

The present invention is directed to an improved stand assembly particularly for use in conjunction with a turf core harvester apparatus. The typical turf core harvester apparatus has a lower end constituting a turf core input end and an elevated turf core discharge end with a conveyor belt supported therebetween. The conveyor belt mechanism is supported by a transportation wheel preferably having shock absorbing characteristics. The turf core harvester apparatus is mounted by suitable mounting means upon an accompanying transportation vehicle, such as for example a cart for transportation along the area of turf which requires harvesting. The angle of incline of the conveyor belt may be changed from an operative angle position to an inoperative angle position for removal of the core harvester apparatus from the transportation vehicle.

The improved stand assembly of the present invention includes an upper end bracket attached to the core harvester apparatus proximate the elevated turf core discharge end. An upper support arm, for removable attachment to the upper end bracket when in the first operative position, is provided to support substantially the full weight of the turf core harvester apparatus when disposed into the second or inoperative position. A lower end support arm is further provided for removable engagement of the lower end of the core harvester apparatus when in the first operative position and to support substantially the full weight of the turf core harvester apparatus when disposed into the second inoperative position. A frame is further provided to connect the upper support arm to the lower end support arm.

Further exemplary embodiments of the turf core apparatus hereof are described in greater detail hereinbelow.

BRIEF DESCRIPTION OF THE DRAWING

The improved stand assembly for a turf core harvester apparatus of the present invention is depicted in the accompanying drawing, and in which:

FIG. 1 is a fragmentary side elevational view of an exemplary turf core harvester machine for gathering and/or collecting ground particles, turf cores and the like, suitable for use in conjunction with the improved stand assembly of the present invention;

FIG. 2 is a perspective view of the improved stand assembly for a turf core harvester apparatus depicting the upper support arm for removal of the attachment to the upper end bracket which has been installed upon the turf core harvester apparatus, the lower end support arm for removable engagement with the lower end of the core harvester apparatus and further showing stand wheels attached to a bottom surface of the improved stand assembly;

FIG. 3 is a detailed perspective drawing illustrating the upper end bracket attached to the core harvester apparatus proximate the elevated turf core discharge end thereof;

FIG. 4 is a side view showing the details of the stand wheels for transportation of the improved stand assembly; and FIG. 5 is a perspective view of the improved stand assembly of the present invention installed upon a suitable turf core harvester apparatus and engaging the upper end bracket attached to the turf core harvester apparatus proximate the elevated lawn discharge end thereof.

DETAILED DESCRIPTION OF PREFERRED EMBODIMENTS

The turf core harvester apparatus as set forth in FIG. 1 is exemplary of apparatus which may be used in conjunction with the improved stand assembly of the present invention. Such turf core harvester apparatus 10 is useful particularly for gathering and collecting turf cores or plugs which are formed by tubular tine type aerator devices and deposited on the turf surface, such as in areas of golf courses, or other groomed lawn surfaces from which it is desirable to remove such turf or other cores. Such turf core harvester apparatus 10 is useable for collecting such turf core items or other similar or particulate materials or articles.

As a general matter, the turf core harvester apparatus 10 includes an upwardly inclined conveyor belt or elevator generally indicated at 12, which is mounted on the side of a motorized transportation vehicle indicated generally at 14. Such transportation vehicle 14 may in some embodiments include a pair of driven rear wheels 16,16 and a single forward wheel 18 steerable through a steering wheel 20 by the operator who sits on seat 21. An open top receptacle or bed 22 is carried on the rearward end of the transport vehicle and may be pivoted upwardly in some embodiments to facilitate dumping.

A transverse endless belt type conveyor may be preferably utilized, as indicated schematically at 24 in FIG. 1, and which is supported on the forward end of the receptacle 22 to receive turf cores or other particles to be harvested from the conveyor 12. The inclined conveyor or elevator 12 has a lower end 12a which is cooperative with article gathering means in the form of a pair of forwardly diverging gathering arms or blades 26 and 28. During normal operation the gathering arms 26 and 28 are supported to engage the turf or ground surface and to guide turf, cores, plugs or other particles into the lower entry end of the conveyor. The conveyor 12 is operative to convey the gathered particles to an elevated or upper discharge end 12b for discharge through a shoot 30 into the transverse conveyor 24 for deposit into the receptacle dump bed 22, in some embodiments.

A caster wheel pivot assembly indicated generally at 142 is provided for the purpose of prevention of creating a side loading moment on the transportation vehicle 14 by means of the side mounted conveyor 12, and to maintain a generally even disposition on the turf surface.

As indicated, means are provided on turf core harvester machine 10 to vary the angle of the conveyor belt of the core harvester apparatus from a first or operative angled position to a second or inoperative angled position. These and other aspects of an exemplary turf core harvester apparatus are set forth in U.S. Pat. No. 4,878,802, as referred to supra, and the full description of that patent is incorporated by reference herein.

The improved stand assembly generally 200 of the present invention per se includes an upper end bracket 202 which is attached to core harvester apparatus 10 proximate the elevated lawn core discharge end 12b thereof, as shown particularly in FIG. 3 hereof.

Improved stand assembly 200 further includes at least one upper support arm 206 for removable engagement with upper end bracket 202 as shown in FIGS. 3 and 5 when in the first operative position, and to support the weight of turf core harvester apparatus 10 when disposed into the second or inoperative position, such as for removal of turf core harvester apparatus 10 from its accompanying transportation vehicle 14, as may be necessary for service on turf core harvester apparatus 10.

At least one lower end support arm 208 is further provided for removable engagement with lower end 210 of the core harvester apparatus 10 when in the first or operative position and to support the weight of lawn core apparatus 10 when disposed into the second or inoperative position. A frame 212 is provided for connecting upper support arm 206 and the lower end support arm 208 of improved stand assembly 200 of the present invention.

In preferred embodiments the turf core harvester support stand 200 of the present invention includes stand wheels 214 attached to a bottom surface 216 of the improved stand assembly 200, as depicted in FIG. 4. In improved stand 200 of the present invention, stand wheels 214 are disposed upon stand assembly 200 at a location beneath the lower end support arm 208. Such stand wheels 214 are connected to frame 212 for transporting core harvester apparatus 200 when in the second inoperative positions.

In improved stand 200 of the present invention, frame 212 connecting said upper support arm 206 and said lower end support arm 208 is connected thereto in some preferred embodiments at only one end 218 of upper support arm 206 and at only one end 219 of lower end support arm 208.

In addition to the above features, upper end bracket 202 comprises in some preferred embodiements a support tube 203 disposed upon the conveyor belt frame. Such support tube 203 is preferably disposed essentially transversely to conveyor 12.

Also in the improved turf core harvester support stand 200 the upper support arm 206 preferably comprises in cross-section a selected defined shape and the cross-section of the upper end bracket support tube 203 matchingly conforms thereto to be fit therewithin, as shown in FIG. 3. In these and other embodiments, the upper support arm 206 may preferably be essentially horizontally disposed, and lower end support arm 208 may also preferably be essentially horizontally disposed.

In improved stand 200 of the present invention, frame 212 includes a generally inclined portion 220 having lower end support arm 208 disposed at the distal end 222 thereof, and a generally vertical portion 224 having the proximal end 226 of the generally inclined portion 220 attached at a selected point between the ends 222,226 thereof.

This generally vertical portion 224 of frame 212 has the upper support arm 206 attached to the upper end 230 thereof and includes stand wheels 214 disposed at the bottom end 232 thereof.

Such frame 212 and the various portions thereof preferably consist of a tubular metal.

In improved stand 200 of the present invention lower end support arm 208 may comprise angle iron 234 to provide a flat upper service 236 thereof for supporting the lower end 12a of core harvester 10.

Such upper end bracket 202 is preferably substantially H-shaped in plan view shows in FIG. 3.

Such upper end bracket 202 may further include at least two support members 238,238 disposed longitudinally of conveyor 12 and a support tube 240 disposed transversely and attached thereto.

Such support tube 240 is preferably disposed above and attached to longitudinally disposed support members 238, 238.

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. An improved stand assembly for a core harvester apparatus having a lower end core input end and an elevated core discharge end, and a conveyor belt supported by a conveyor belt frame and disposed in selectable inclined angled positions therebetween, said conveyor belt supported by a core harvester transportation wheel, means for mounting the core harvester apparatus upon an accompanying transportation vehicle for transportation by such vehicle along a selected path of turf including material to be harvested, and angle variation means for changing the inclined angle of said core harvester apparatus from at least a first operative angled position to a second inoperative angled position for removal of said core harvester apparatus from said accompanying transportation vehicle, said improved stand assembly comprising;

an upper end bracket attached to said core harvester apparatus proximate said elevated core discharge and thereof;

an upper support arm for removable engagement with said upper end bracket when in the first operative angled position and to support substantially the full weight of said core harvester apparatus when disposed into said second inoperative position;

a lower end support arm for removable engagement with said lower end of said core harvester apparatus when in the first operative angled position and to support substantially the full weight of said core harvester apparatus when disposed into said second inoperative angled position; and a frame connecting said upper support arm and said lower end support arm.

2. The improved turf core harvester support stand of claim 1 wherein said stand further comprises stand wheels attached to a bottom surface of said improved stand assembly.

3. The improved turf core harvester support stand of claim 1 wherein said upper end bracket comprises a support tube disposed upon said conveyor belt frame.

4. The improved turf core harvester support stand of claim 3 wherein said support tube is disposed essentially transversely to said conveyor belt.

5. The improved turf core harvester support stand of claim 3 wherein said upper support arm comprises in cross-section a defined shape and the cross-section of said upper end bracket support tube matchingly conforms thereto to be fit therewithin.

6. The improved turf core harvester support stand of claim 1 wherein said upper support arm is essentially horizontally disposed.

7. The improved turf core harvester support stand of claim 1 wherein said lower end support arm is essentially horizontally disposed.

8. The improved turf core harvester support stand of claim 1 wherein said frame connecting said upper support arm and said lower end support arm is connected thereto at only one end of said upper support arm and at only one end of said lower end support arm.

9. The improved turf core harvester support stand of claim 1 further comprising stand wheels which are disposed upon said stand assembly at a location beneath said lower end support arm.

10. The improved turf core harvester support stand of claim 9 further comprising additional stand wheels connected to said frame for transporting said core harvester apparatus when in the second inoperative position.

11. The improved turf core harvester support stand of claim 10 wherein said frame comprises a generally inclined portion having a proximal end and a distal end and with said lower end support arm disposed at the distal end thereof, and a generally vertical portion having the proximal end of said general.

12. The improved turf core harvester support stand of claim 11 wherein said generally vertical portion of said frame has an upper end and a bottom end and has said upper support arm attached to the upper end thereof and includes said stand wheels disposed at the bottom end thereof.

13. The improved turf core harvester support stand of claim 1 wherein said frame comprises tubular metal.

14. The improved turf core harvester support stand of claim 1 wherein said upper support arm comprises tubular metal.

15. The improved turf core harvester support stand of claim 1 wherein said lower end support arm comprises tubular metal.

16. The improved turf core harvester support stand of claim 15 wherein said lower end support arm further includes angle iron disposed longitudinally above and along said tubular metal to provide a flat upper surface thereof for supporting the lower end of the core harvester.

17. The improved turf core harvester support stand of claim 1 wherein said upper end bracket is substantially H-shaped in plan view.

18. The improved turf core harvester support stand of claim 1 wherein said upper end bracket includes at least two support members disposed longitudinally of said conveyor belt and a support tube disposed transversely thereof and attached thereto.

19. The improved stand of claim 18 wherein said support tube is disposed above and attached to said longitudinally disposed support members.

* * * * *